US012736006B2

(12) United States Patent
Zhang et al.

(10) Patent No.: US 12,736,006 B2
(45) Date of Patent: Sep. 15, 2026

(54) MOTORCYCLE ENGINE

(71) Applicant: ZHEJIANG QIANJIANG MOTORCYCLE CO., LTD., Zhejiang (CN)

(72) Inventors: Licheng Zhang, Taizhou City (CN); Chao Jin, Taizhou City (CN); Le Gao, Taizhou City (CN); Long Jiang, Taizhou City (CN); Linjiang Zhang, Taizhou City (CN)

(73) Assignee: Zheijing Qianjiang Motorcycle Co., Ltd., Taizhou City (CN)

( * ) Notice: Subject to any disclaimer, the term of this patent is extended or adjusted under 35 U.S.C. 154(b) by 106 days.

(21) Appl. No.: 18/995,382

(22) PCT Filed: Jul. 4, 2023

(86) PCT No.: PCT/CN2023/105632
§ 371 (c)(1),
(2) Date: Jan. 16, 2025

(87) PCT Pub. No.: WO2024/027444
PCT Pub. Date: Feb. 8, 2024

(65) Prior Publication Data

US 2026/0251091 A1 Aug. 27, 2026

(30) Foreign Application Priority Data

Aug. 2, 2022 (CN) ........................ 202210921628.X

(51) Int. Cl.
*F02B 75/06* (2006.01)
*F02B 61/02* (2006.01)
(Continued)

(52) U.S. Cl.
CPC .............. *F02B 75/06* (2013.01); *F02B 61/02* (2013.01); *F02B 75/22* (2013.01); *F02B 2075/1808* (2013.01)

(58) Field of Classification Search
CPC .............. F02B 2075/1808; F02B 75/22; F02B 61/02; F02B 75/06
See application file for complete search history.

(56) References Cited

U.S. PATENT DOCUMENTS

| | | | | |
|---|---|---|---|---|
| 4,191,138 | A * | 3/1980 | Jaulmes | F02B 33/18 123/69 R |
| 6,026,769 | A * | 2/2000 | Anbarasu | F02M 61/08 123/70 R |
| 6,729,289 | B1 * | 5/2004 | Laimbock | F16F 15/261 123/192.2 |
| 6,895,919 | B1 * | 5/2005 | Taxon | F02B 75/221 123/192.2 |
| 2012/0260881 | A1 | 10/2012 | Trease | |

FOREIGN PATENT DOCUMENTS

| | | | |
|---|---|---|---|
| CN | 1617977 | A | 5/2005 |
| CN | 101052822 | A | 10/2007 |

(Continued)

OTHER PUBLICATIONS

International Search Report of PCT/CN2023/105632.

*Primary Examiner* — Kevin A Lathers
(74) *Attorney, Agent, or Firm* — Minder Law Group; Willy H. Wong

(57) ABSTRACT

A motorcycle engine includes a crankcase with two cylinder pore channels, a combustion cylinder and a balancing cylinder are respectively connected at outer ends of the two cylinder pore channels, the combustion cylinder includes a first cylinder, the balancing cylinder includes a second cylinder and a second piston slidingly fitted inside the second cylinder, the second piston is provided with an air vent penetrating from top to bottom, a shaft axis of the
(Continued)

combustion cylinder and a shaft axis of the balancing cylinder are arranged crosswise in a V shape, the second cylinder and an arrangement direction of the cylinder pore channel in which the second cylinder is located are arranged crosswise in an axial direction, and a lower end of the second cylinder (31) is deviated toward a side where the first cylinder is located with respect to the arrangement direction of the cylinder pore channel.

9 Claims, 5 Drawing Sheets

(51) Int. Cl.
*F02B 75/18* (2006.01)
*F02B 75/22* (2006.01)

(56) References Cited

FOREIGN PATENT DOCUMENTS

| | | | |
|---|---|---|---|
| CN | 200978717 | Y | 11/2007 |
| CN | 101149003 | A | 3/2008 |
| CN | 201284814 | Y | 8/2009 |
| CN | 101603577 | A | 12/2009 |
| CN | 109707508 | A | 5/2019 |
| CN | 114439609 | A | 5/2022 |
| CN | 114483361 | A | 5/2022 |
| CN | 217632679 | U | 10/2022 |
| CN | 115263545 | A | 11/2022 |
| JP | S59175647 | A | 10/1984 |
| JP | H02123257 | A | 5/1990 |
| JP | H08284727 | A | 10/1996 |

* cited by examiner

MOTORCYCLE ENGINE

RELATED APPLICATIONS

This application claims priority to PCT Patent Application No. PCT/CN2023/105632 filed Jul. 4, 2023 and China Patent Application No. CN202210921628.X filed Aug. 2, 2022.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

TECHNICAL FIELD

The present disclosure belongs to the technical field of motorcycles and relates to a motorcycle engine.

BACKGROUND

As national regulations on emissions and fuel consumption continue to be tightened, the demand for research and development of small-displacement engines is increased, single-cylinder engines have a small displacement but significant vibration, and conventional reciprocating inertial force balancing mechanisms for the single-cylinder engines achieve balance by disposing a balance shaft. The balance shaft is parallel to a crankshaft, an angular velocity of the balance shaft is equal to an angular velocity of the crankshaft, and a balance weight is mounted on the balance shaft; and the balance shaft is coupled to the crankshaft through a gear. Component forces of a centrifugal force of the balance weight of the balance shaft in a direction parallel to its centerline are combined into a force acting along a centerline of a cylinder, the force is equal to a reciprocal inertial force, but the direction is opposite, thus achieving balance.

A patent document with an application publication number of CN114483361A discloses a crankshaft balancing device, including a crankshaft, a connecting rod, a functional piston and a balancing piston, wherein the functional piston is assembled in a corresponding cylinder to form a functional cylinder, and performs four-stroke operation of air inlet, compression, work and exhaust to achieve power output. The balancing piston is assembled in a corresponding cylinder to form a balancing cylinder, and the balancing piston reciprocates in the corresponding cylinder when operating along with the crankshaft. A through air vent is formed in the balancing piston, so that a top surface of the balancing piston communicates with a crankcase, thereby preventing large pumping losses during intake and exhaust strokes of the engine and accumulation of engine oil on the top surface of the piston.

The above structure can realize the design of a multi-cylinder balanced small-displacement engine by disposing the balancing piston on a multi-cylinder crankcase, that is, one of the functional cylinders on the multi-cylinder crankcase is provided with the balancing piston and then changed to the balancing cylinder. However, the balancing cylinder and the functional cylinder that originally does work are quite different in structure and counterweight force, so it is often difficult for the balancing cylinder to keep real balance after assembly.

SUMMARY

For the above problems in the prior art, an object of the present disclosure is to provide a motorcycle engine. The technical problem to be solved by the present disclosure is to achieve cost control while improving the balance effect.

The object of the present disclosure can be achieved by the following technical solution:

provided is a motorcycle engine, including a crankcase, wherein the crankcase is provided with two cylinder pore channels, a combustion cylinder and a balancing cylinder are respectively connected at outer ends of the two cylinder pore channels, the combustion cylinder includes a first cylinder and a first piston slidingly fitted inside the first cylinder, the balancing cylinder includes a second cylinder and a second piston slidingly fitted inside the second cylinder, the second piston is provided with an air vent penetrating from top to bottom, wherein a shaft axis of the combustion cylinder and a shaft axis of the balancing cylinder are arranged crosswise in a V shape, the second cylinder and an arrangement direction of the cylinder pore channel in which the second cylinder is located are arranged crosswise in an axial direction, and a lower end of the second cylinder is deviated toward a side where the first cylinder is located with respect to the arrangement direction of the cylinder pore channel in which the second cylinder is located.

The crankcase is configured to house a crankshaft and connecting rod components, the first piston is connected to the crankshaft, the second piston is also connected with the crankshaft, the combustion cylinder and the balancing cylinder which is not involved in the work are respectively disposed at the two cylinder pore channels, the combustion cylinder can drive the first piston by doing work through combustion to drive a connecting rod and the crankshaft to move, the second piston in the balancing block is provided with the air vent and is driven by the crankshaft to move and does not participate in doing work but is only configured to balance the cylinder force of the combustion cylinder to achieve the design of a small-displacement engine, and the first cylinder and the second cylinder are configured to provide guidance for the movement of the first piston and the second piston, respectively. The shaft axis of the combustion cylinder and the shaft axis of the balancing cylinder are arranged crosswise in the V shape, and the lower end of the second cylinder is deviated toward the side where the first cylinder is located with respect to the arrangement direction of the cylinder pore channel in which the second cylinder is located, so that the original crankcase component can be utilized during assembly of the engine, and the second cylinder is arranged in such a direction that an angle between a moving direction of the second piston in the balancing cylinder and a moving direction of the first piston in the combustion cylinder is larger, the effect of adaptively dissipating vibration is achieved after the original combustion cylinder is replaced with the balancing cylinder, and the vibration balancing effect is improved while controlling the production cost.

In one embodiment of the motorcycle engine, the balancing cylinder further includes a connecting base having a cylindrical shape and a closed upper end, the second cylinder is connected in the connecting base, an outer periphery of the connecting base is provided with a flange arranged circumferentially, and the flange is fixedly connected with a port face of the cylinder pore channel in which the second cylinder is located. In this way, the balancing cylinder can be stably connected to the original crankcase component, and the connecting base can be adaptably polished and corrected as claimed in the angle requirements of the second cylinder during installation and debugging to ensure the balance effect.

In one embodiment of the motorcycle engine, an edge of the flange is provided with a flanging circumferentially arranged and downwardly extending, a bottom surface of the flanging is fitted to the port face of the cylinder pore channel in which the second cylinder is located, and the flange is fixedly connected with the crankcase by bolts arranged in a circumferential direction of the flanging. In this way, when the angle of the second cylinder needs to be adjusted, the adjustment can be realized by polishing the flanging, the difficulty of polishing is lower, the requirements on process equipment are reduced, and the efficiency is improved.

In one embodiment of the motorcycle engine, the second cylinder has an outer diameter dimension smaller than a smallest inner diameter dimension of the cylinder pore channel in which the second cylinder is located, and the lower end of the second cylinder is inserted into the cylinder pore channel in which the second cylinder is located. In this way, it is ensured that the second cylinder can provide sufficient guiding stroke for the second piston, ensuring stable movement and balance effects.

In one embodiment of the motorcycle engine, a crank arm is connected inside the crankcase, the crank arm includes a rocker arm and a crankpin axially disposed, an outer circumferential surface of the crankpin is sleeved with a first connecting rod and a second connecting rod, an end of the first connecting rod is rotatably connected to the first piston which can reciprocally slide in the first cylinder, an end of the second connecting rod is rotatably connected to the second piston, an outer diameter dimension of the second piston is adapted to an inner diameter dimension of the second cylinder, and an outer circumferential surface of the second piston is a straight cylindrical surface. In this way, an outer periphery of the second piston in the balancing cylinder is not provided with a piston ring structure, so that the movement resistance of the second piston is reduced, thereby more precisely balancing the cylinder force generated by the combustion cylinder, and ensuring that the vibration state of the engine is stable.

In one embodiment of the motorcycle engine, the first connecting rod and the second connecting rod sleeve the same crankpin. In this way, the structural compactness of a V-type engine is advantageously ensured while reducing the influence of the lateral eccentric load between the first connecting rod and the second connecting rod, ensuring the balance effect.

In one embodiment of the motorcycle engine, the outer diameter dimension of the second piston is smaller than an outer diameter dimension of the second piston of the first piston. In this way, the structural size and inertial force of the second piston can be reduced, and the balance effect is improved while improving the structural compactness.

In one embodiment of the motorcycle engine, a surface of the connecting base is protruding and spaced heat radiating ribs. Thus, the heat radiating ribs can improve the phenomenon of heat accumulation inside the balancing cylinder, and ensure the heat radiating effect of the balancing cylinder.

In one embodiment of the motorcycle engine, a shaft axis of the first cylinder and a shaft axis of the second cylinder are perpendicular to each other. In this way, a better vibration balancing effect of the balancing cylinder is achieved under the condition of ensuring that the original crankcase can be used.

Compared with the prior art, the advantages of the present disclosure are as follows:

The original crankcase component can be utilized during assembly of the motorcycle engine, and the second cylinder is arranged in such a direction that an angle between a moving direction of the second piston in the balancing cylinder and a moving direction of the first piston in the combustion cylinder is larger, the effect of adaptively dissipating vibration is achieved after the original combustion cylinder is replaced with the balancing cylinder, and the vibration balancing effect is improved while controlling the production cost.

Figure 1:
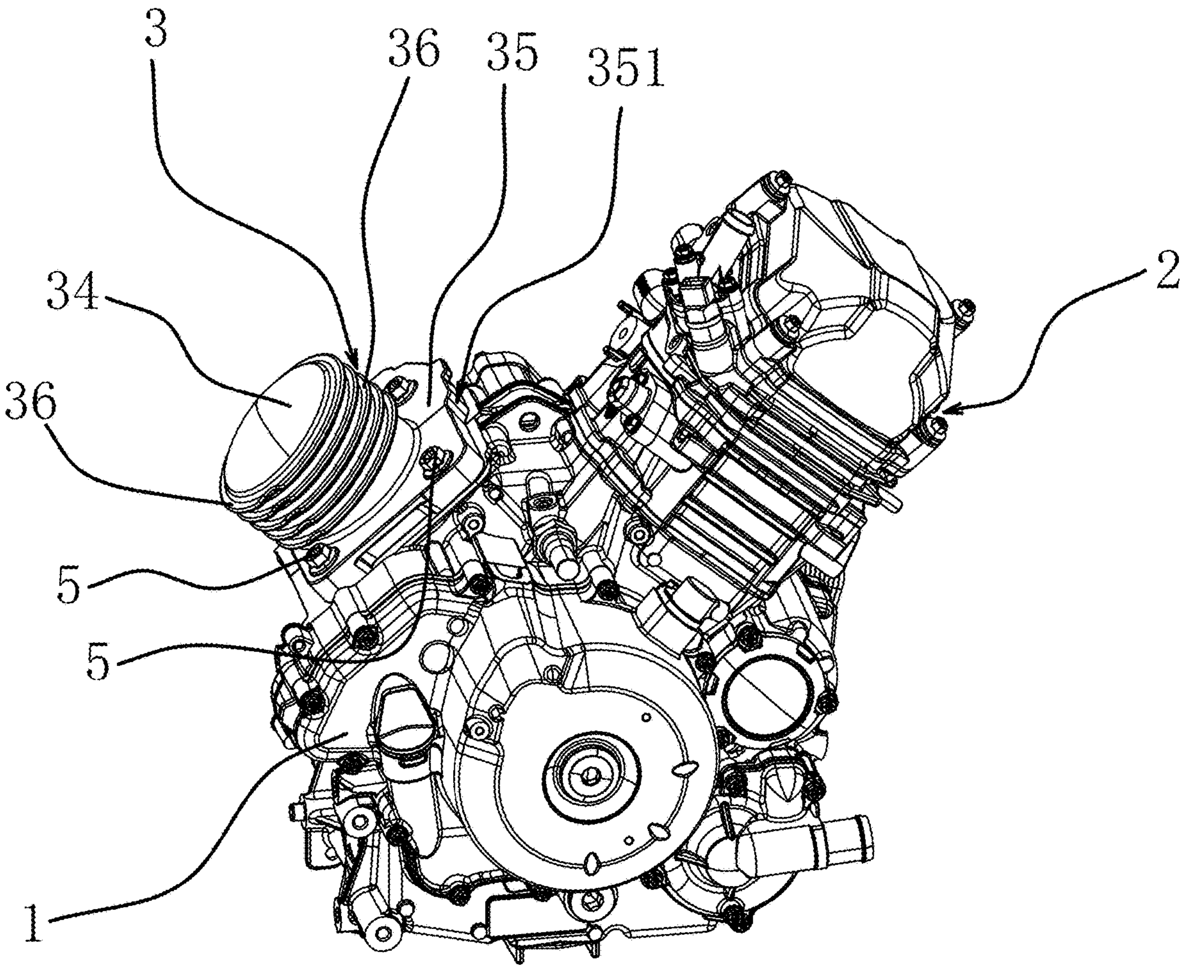
FIG. 1 is a schematic perspective structural view in one embodiment.

In the drawings, 1, crankcase; 11, cylinder pore channel; 2, combustion cylinder; 21, first cylinder; 22, first connecting rod; 23, first piston; 3, balancing cylinder; 31, second cylinder; 32, second connecting rod; 33, second piston; 331, air vent; 34, connecting base; 35, flange; 351, flanging; 36, heat radiating rib; 4, crank arm; 41, crankpin; 42, rocker arm; and 5, bolt.

DETAILED DESCRIPTION

The following are specific embodiments of the present disclosure and the technical solution of the present disclosure is further described with reference to the accompanying drawings, but the present disclosure is not limited to these embodiments.

Figure 2:
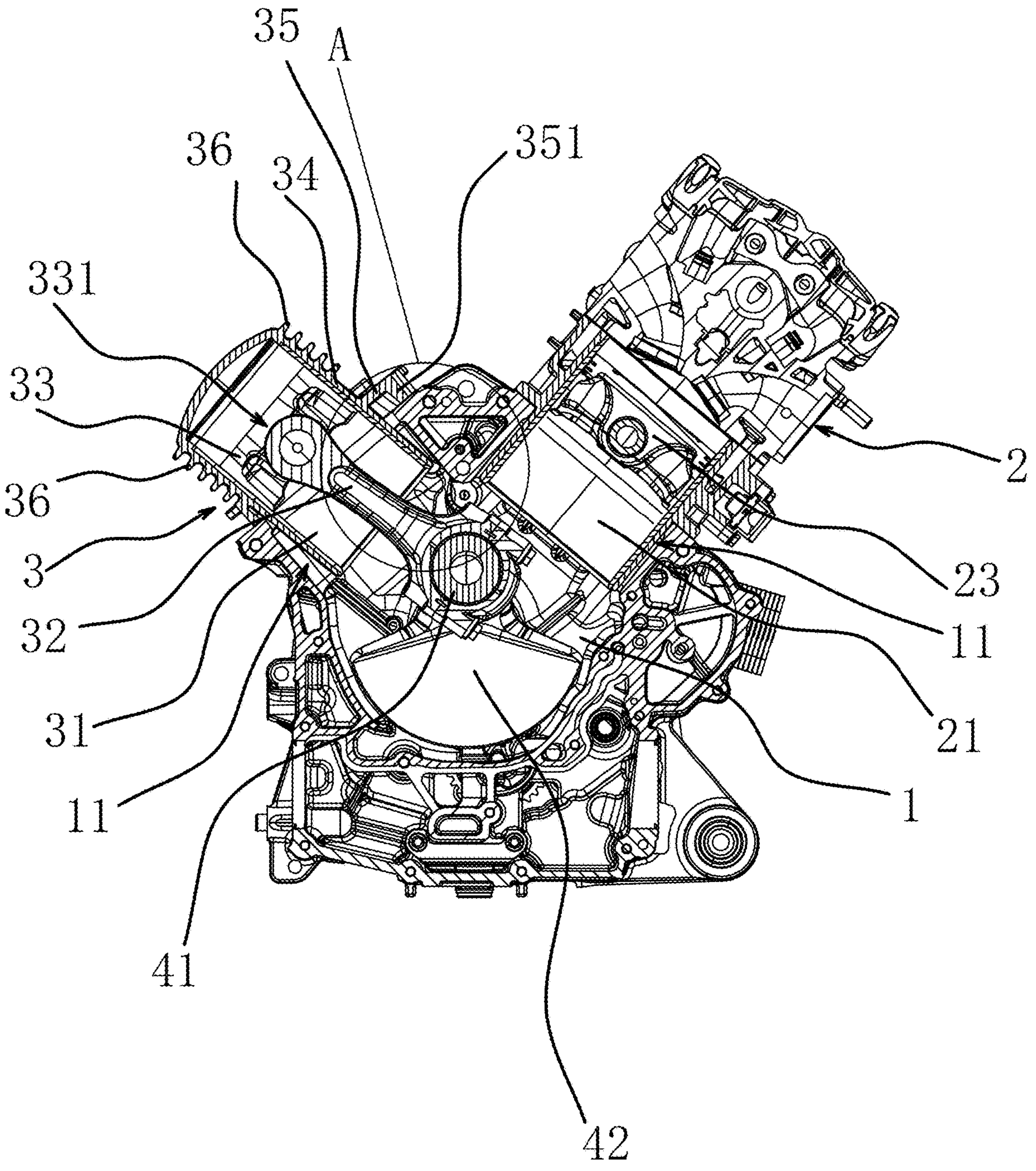
FIG. 2 is a schematic cross-sectional structural diagram in one embodiment.
Figure 3:
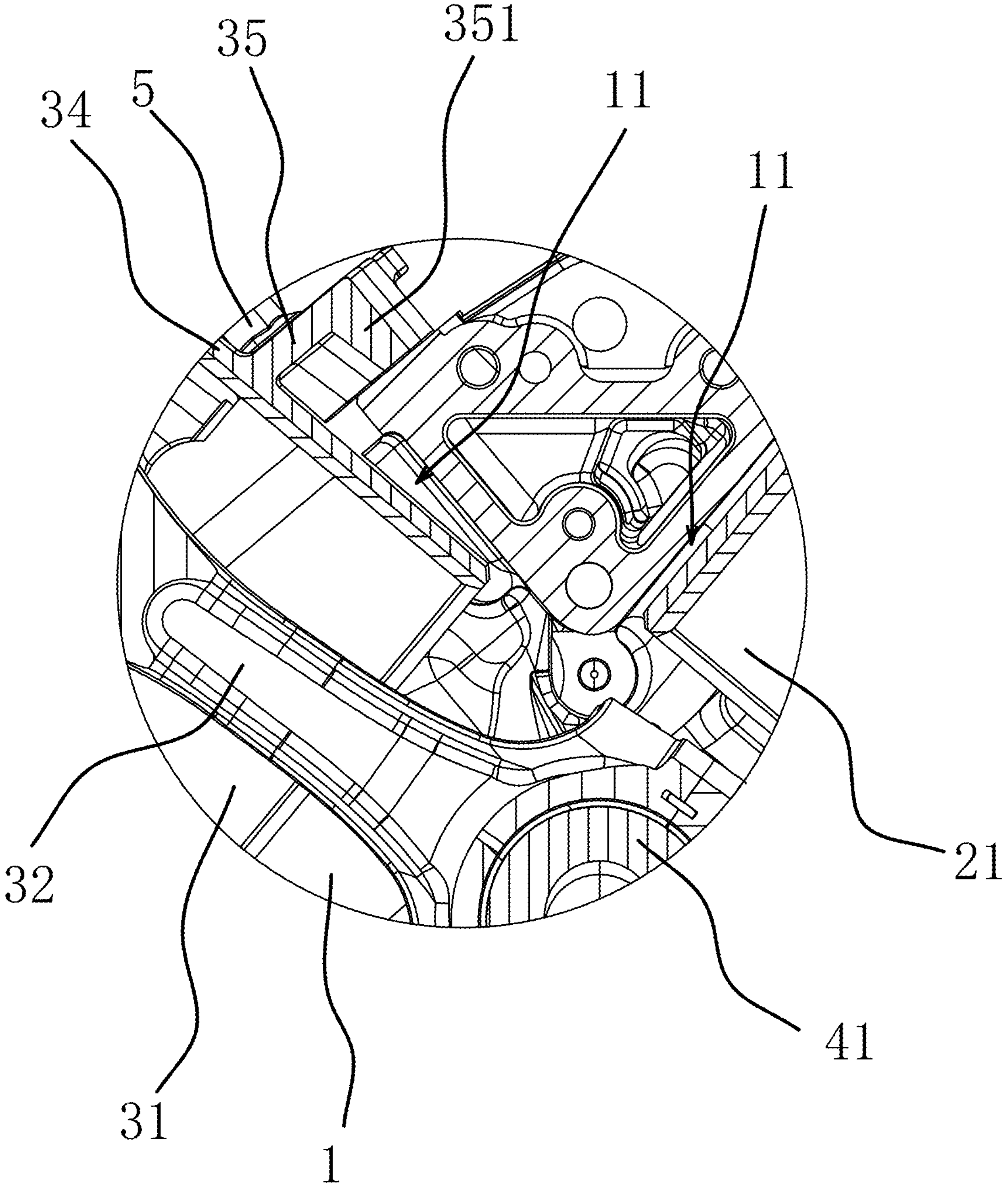
FIG. 3 is an enlarged view of a portion A in FIG. 2.

As shown in FIGS. 1 and 2, a motorcycle engine includes a crankcase 1 provided with two cylinder pore channels 11 formed at an angle of 80 degrees and arranged in a V shape, and a combustion cylinder 2 and a balancing cylinder 3 which is not involved in the work are respectively connected to the two cylinder pore channels 11. As shown in conjunction with FIG. 3, the combustion cylinder 2 includes a first cylinder 21 and a first piston 23 slidingly fitted inside the first cylinder 21, and the balancing cylinder 3 includes a second cylinder 31 and a second piston 33 slidingly fitted inside the second cylinder 31, and a lower end of the second cylinder 31 is deviated toward a side where the first cylinder 21 is located with respect to an arrangement direction of the cylinder pore channel 11 in which the second cylinder 31 is located. As shown in connection with FIGS. 4 and 5, the crankcase 1 is configured to house a crank arm 4, a first connecting rod 22 and a second connecting rod 32, the first piston 23 is connected to the crank arm 4 by the first connecting rod 22, the second piston 33 is connected to the crank arm 4 by the second connecting rod 32, the two cylinder pore channels 11 are in a V-shaped arrangement, and the combustion cylinder 2 and the balancing cylinder 3 which is not involved in the work are respectively disposed in the two cylinder pore channels 11, the combustion cylinder 2 can drive the first piston 21 by doing work through combustion to drive the first connecting rod 22 and the crank arm 4 to move, the second piston 33 in the balancing block 3 is provided with an air vent 331 and is driven by the crank arm 4 to move, and does not participate in doing work but is only configured to balance the cylinder force of the combustion cylinder 2 to achieve the design of a small-displacement engine. The first cylinder 21 and the second cylinder 31 are configured to provide guidance for the movement of the first piston 23 and the second piston 33, respectively; and the lower end of the second cylinder 31 is deviated toward the side where the first cylinder 21 is located with respect to the arrangement direction of the cylinder pore channel 11 in which the second cylinder 31 is located, so that the component of the original crankcase 1 can be utilized during assembly of the engine, and the second cylinder 31 is arranged in such a direction that an angle between a moving direction of the second piston 33 in the balancing cylinder 3 and a moving direction of the first piston 23 in the combustion cylinder 2 is larger, the effect of adaptively dissipating vibration is achieved after the original combustion cylinder 2 is replaced with the balancing cylinder 3, and the vibration balancing effect is improved while controlling the production cost.

Figure 4:
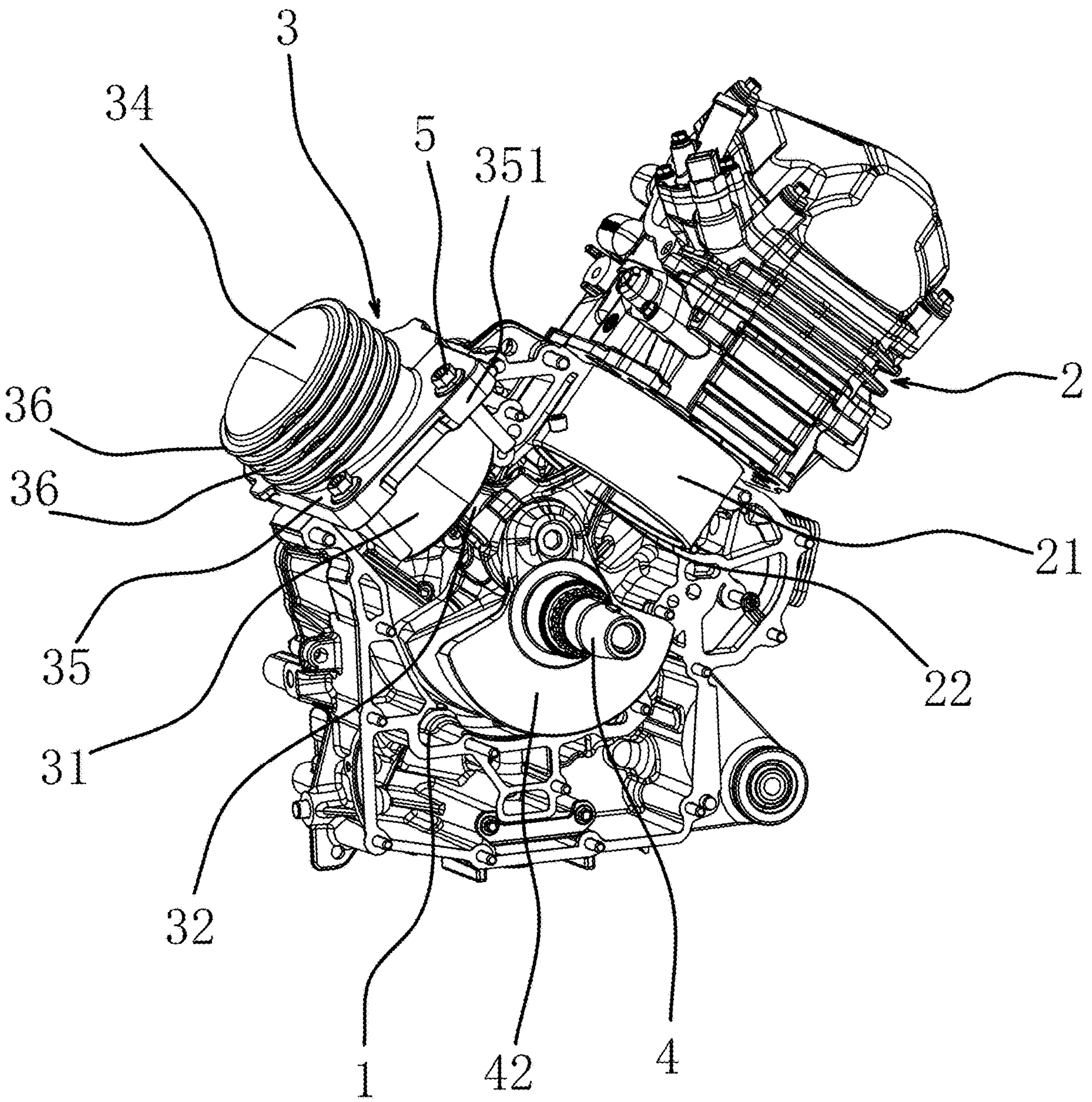
FIG. 4 is a schematic perspective structural view of a partial structure in one embodiment.
Figure 5:
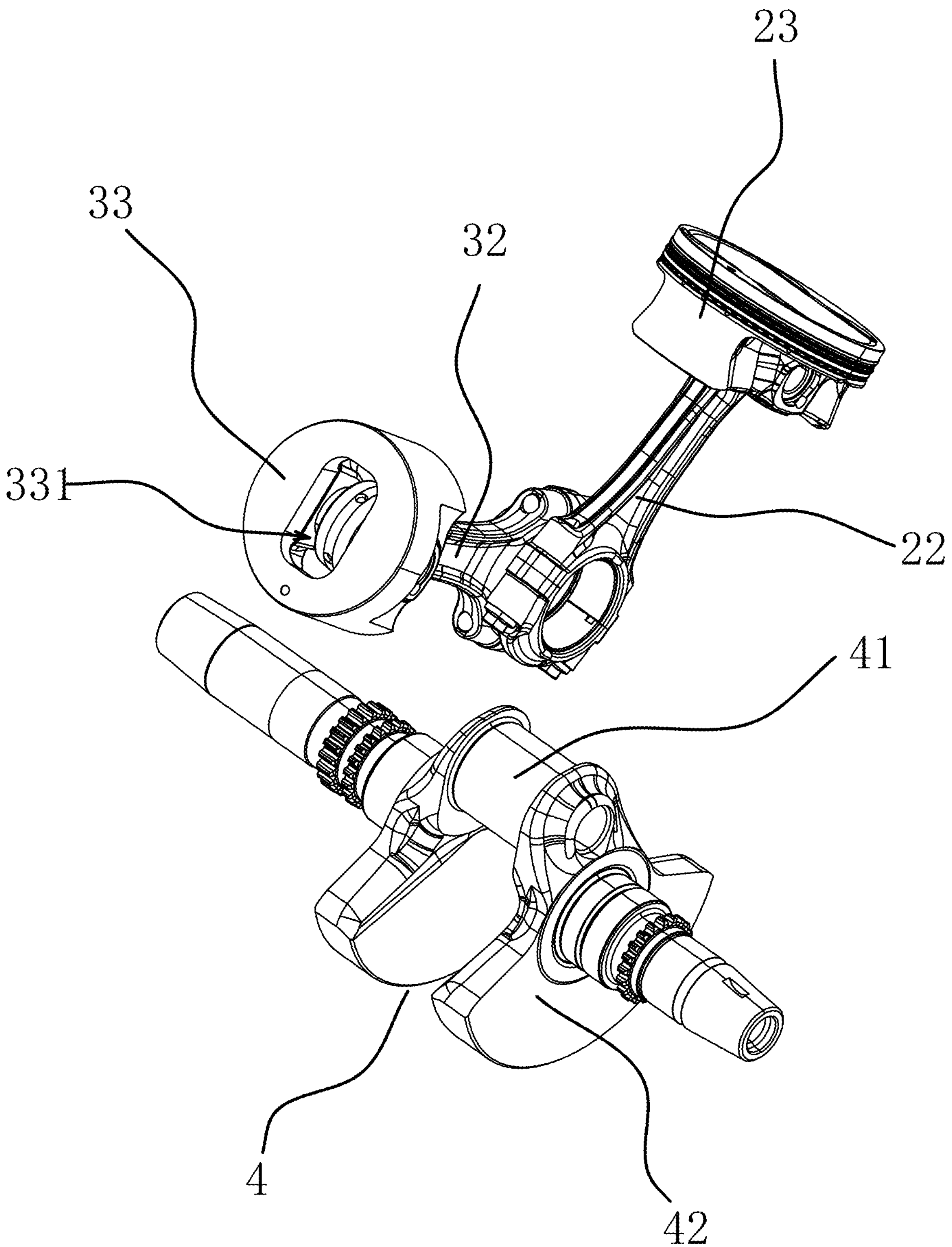
FIG. 5 is an exploded schematic view of a crank arm and a connecting rod-piston structure in one embodiment.

In particular, as shown in FIGS. 4 and 5, the crank arm 4 is connected inside the crankcase 1, an outer circumferential surface of the crank arm 4 is sleeved with the first connecting rod 22 and the second connecting rod 32, an end of the first connecting rod 22 is rotatably connected to the first piston 23 which can reciprocally slide in the first cylinder 21, and an end of the second connecting rod 32 is rotatably connected to the second piston 33 which can reciprocally slide in the second cylinder 31. As shown in conjunction with FIGS. 2 and 3, an end face of the second piston 33 is provided with the through air vent 331, an outer diameter dimension of the second piston 33 is adapted to an inner diameter dimension of the second cylinder 31, and an outer circumferential surface of the second piston 33 is a straight cylindrical surface. In this way, an outer periphery of the second piston 33 in the balancing cylinder 3 is not provided with a piston ring structure, so that the movement resistance of the second piston 33 is reduced, thereby more precisely balancing the cylinder force generated by the combustion cylinder 2, and ensuring that the vibration state of the engine is stable. As shown in FIG. 2, the second cylinder 31 has an outer diameter dimension smaller than the smallest inner diameter dimension of the cylinder pore channel 11 in which the second cylinder 31 is located, and the lower end of the second cylinder 31 is inserted into the cylinder pore channel 11 in which the second cylinder 31 is located. As shown in FIGS. 4 and 5, the crank arm 4 includes a rocker arm 42 and a crankpin 41 axially disposed, and the first connecting rod 22 and the second connecting rod 32 sleeve the same crankpin 41. In this way, the structural compactness of a V-type engine is advantageously ensured while reducing the influence of the lateral eccentric load between the first connecting rod 22 and the second connecting rod 32, ensuring the balance effect. Preferably, the outer diameter dimension of the second piston 33 is smaller than an outer diameter dimension of the first piston 23. In this way, the structural size and inertial force of the second piston 33 can be reduced, and the balance effect is improved while improving the structural compactness. A shaft axis of the first cylinder 21 and a shaft axis of the second cylinder 31 are perpendicular to each other. In this way, a better vibration balancing effect of the balancing cylinder 3 is achieved under the condition of ensuring that the original crankcase 1 can be used.

As shown in FIGS. 1 to 4, the balancing cylinder 3 further includes a connecting base 34 having a cylindrical shape and a closed upper end, the second cylinder 31 is connected in the connecting base 34, an outer periphery of the connecting base 34 is provided with a flange 35 arranged circumferentially, and the flange 35 is fixedly connected with a port face of the cylinder pore channel 11 in which the second cylinder 31 is located. An edge of the flange 35 is provided with a flanging 351 circumferentially arranged and extending downward, a bottom surface of the flanging 351 is fitted to the port face of the cylinder pore channel 11 in which the second cylinder 31 is located, and the flange 35 is fixedly connected with the crankcase 1 by bolts 5 arranged in a circumferential direction of the flanging 351. In this way, there is a larger fitting length between the bolts 5 and the connecting base 34, so as to avoid dimensional deviation caused by deformation at the connection, ensure the positional accuracy of the balancing cylinder 3 and ensure the balance effect. An outer periphery of the connecting base 34 is provided with heat radiating ribs 36 circumferentially arranged and spaced up and down. Thus, the heat radiating ribs 36 can improve the phenomenon of heat accumulation inside the balancing cylinder 3, ensuring the heat radiating effect of the balancing cylinder 3.

The specific embodiments described herein are merely illustrative of the spirit of the present disclosure. Those skilled in the art to which the present disclosure belongs may make various modifications or supplements or similar substitutions to the specific embodiments described without departing from the spirit of the present disclosure or being beyond the scope defined by the appended claims.

What is claimed is:

1. A motorcycle engine, comprising a crankcase, wherein the crankcase is provided with two cylinder pore channels, a combustion cylinder and a balancing cylinder are respectively connected at outer ends of the two cylinder pore channels, the combustion cylinder comprises a first cylinder and a first piston slidingly fitted inside the first cylinder, the balancing cylinder comprises a second cylinder and a second piston slidingly fitted inside the second cylinder, the second piston is provided with an air vent-penetrating from top to bottom, wherein a shaft axis of the combustion cylinder and a shaft axis of the balancing cylinder are arranged crosswise in a V shape, the second cylinder and an arrangement direction of the cylinder pore channel in which the second cylinder is located are arranged crosswise in an axial direction, and a lower end of the second cylinder is deviated toward a side where the first cylinder is located with respect to the arrangement direction of the cylinder pore channel in which the second cylinder is located.

2. The motorcycle engine as claimed in claim 1, wherein the balancing cylinder further comprises a connecting base having a cylindrical shape and a closed upper end, the second cylinder is connected in the connecting base, an outer periphery of the connecting base is provided with a flange arranged circumferentially, and the flange is fixedly connected with a port face of the cylinder pore channel in which the second cylinder is located.

3. The motorcycle engine as claimed in claim 2, wherein an edge of the flange is provided with a flanging circumferentially arranged and downwardly extending, a bottom surface of the flanging is fitted to the port face of the cylinder pore channel in which the second cylinder is located, and the flange is fixedly connected with the crankcase by bolts arranged in a circumferential direction of the flanging.

4. The motorcycle engine as claimed in claim 2, wherein an outer peripheral surface of the connecting base is provided with a plurality of heat radiating ribs circumferentially arranged, the plurality of the heat radiating ribs being spaced up and down in an axial direction of the connecting base.

5. The motorcycle engine as claimed in claim 1, wherein the second cylinder has an outer diameter dimension smaller than the smallest inner diameter dimension of the cylinder pore channel in which the second cylinder is located, and the lower end of the second cylinder is inserted into the cylinder pore channel in which the second cylinder is located.

6. The motorcycle engine as claimed in claim 1, wherein a shaft axis of the first cylinder and a shaft axis of the second cylinder are perpendicular to each other.

7. The motorcycle engine as claimed in claim 1, wherein a crank arm is connected inside the crankcase, the crank arm comprises a rocker arm and a crankpin axially disposed, an outer circumferential surface of the crankpin is sleeved with a first connecting rod and a second connecting rod, an end of the first connecting rod is rotatably connected to the first piston which is capable of sliding reciprocally in the first cylinder, the second piston is rotatably connected to an end of the second connecting rod, an outer diameter dimension of the second piston is adapted to an inner diameter dimension of the second cylinder, and an outer circumferential surface of the second piston is a straight cylindrical surface.

8. The motorcycle engine as claimed in claim 7, wherein the first connecting rod and the second connecting rod sleeve the same crankpin.

9. The motorcycle engine as claimed in claim 7, wherein the outer diameter dimension of the second piston is smaller than an outer diameter dimension of the first piston.

* * * * *